(12) United States Patent
Wen

(10) Patent No.: US 10,343,663 B2
(45) Date of Patent: *Jul. 9, 2019

(54) BRAKE MECHANISM

(71) Applicant: Yuan-Hung Wen, Chang Hua County (TW)

(72) Inventor: Yuan-Hung Wen, Chang Hua County (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/962,399

(22) Filed: Apr. 25, 2018

(65) Prior Publication Data

US 2018/0236990 A1 Aug. 23, 2018

Related U.S. Application Data

(63) Continuation-in-part of application No. 15/466,381, filed on Mar. 22, 2017, now abandoned.

(30) Foreign Application Priority Data

May 6, 2016 (TW) .............................. 105114112 A

(51) Int. Cl.
| | | |
|---|---|---|
| *B60T 11/04* | (2006.01) | |
| *B62L 3/02* | (2006.01) | |
| *F16G 11/12* | (2006.01) | |
| *B62K 23/06* | (2006.01) | |
| *B60T 7/10* | (2006.01) | |

(Continued)

(52) U.S. Cl.
CPC ............. *B60T 11/046* (2013.01); *B60T 7/102* (2013.01); *B62K 23/06* (2013.01); *B62L 3/02* (2013.01); *F16G 11/12* (2013.01); *B62K 21/26* (2013.01); *F16D 2125/60* (2013.01)

(58) Field of Classification Search
CPC ........ B62K 23/06; B62K 23/02; B62K 11/14; B62L 3/02; B60T 7/08; B60T 7/10; B60T 7/102; B60T 11/046; G05G 1/04; F16C 1/20; F16C 1/10; F16C 1/101; F16C 1/102; F16C 1/106; F16C 1/12; F16C 1/14; F16C 1/145; F16C 1/262; F16D 2125/62; F16B 7/20
See application file for complete search history.

(56) References Cited

U.S. PATENT DOCUMENTS

| | | | |
|---|---|---|---|
| 5,287,765 A | 2/1994 | Scura | |
| 2010/0186537 A1* | 7/2010 | DuPont | ................. B60T 11/046 74/500.5 |

(Continued)

FOREIGN PATENT DOCUMENTS

| | | |
|---|---|---|
| GB | 435208 A | 9/1935 |
| TW | 497581 U | 8/2002 |

*Primary Examiner* — Richard W Ridley
*Assistant Examiner* — Brian J McGovern
(74) *Attorney, Agent, or Firm* — Muncy, Geissler, Olds & Lowe, P.C.

(57) ABSTRACT

A brake mechanism is provided, including: a main body, for connecting to a vehicle, having a penetrating hole for a wire to dispose therethrough, the wire having an insertion end which is smaller than the penetrating hole in radial dimension; a handle, restrictably pivoted to the main body via a pivot portion, having an assembling portion; the insertion end being directly axially penetrable through the penetrating hole to be fixedly connected to the assembling portion.

9 Claims, 6 Drawing Sheets

(51) Int. Cl.
 *B62K 21/26* (2006.01)
 *F16D 125/60* (2012.01)

(56) References Cited

U.S. PATENT DOCUMENTS

2017/0016178 A1* 1/2017 Wen .......................... D07B 9/00
2017/0082138 A1* 3/2017 Wen ..................... B60T 11/046

* cited by examiner

BRAKE MECHANISM

FIELD OF THE INVENTION

This application is a Continuation-in-Part of U.S. application Ser. No. 15/466,381, filed on Mar. 22, 2017, for which priority is claimed under 35 U.S.C. § 120; and this application claims priority of Application No. 105114112 filed in Taiwan on May 6, 2016 under 35 U.S.C. § 119, the entire contents of all of which are hereby incorporated by reference.

BACKGROUND OF THE INVENTION

Description of the Prior Art

Brake system is very important for safety in driving a vehicle, and every vehicle includes a brake. The brake pad or the like is driven, by pulling the brake wire, to move close to brake face of a rim, so as to make a brake.

The brake is driven through pressing a handle disposed on the vehicle, and the handle includes a main body attached to the vehicle and a lever pivoted to the main body. However, two ends of a conventional brake wire each include an enlarged head portion or stub, and upper portions of the main body and the lever therefore needs through slots for the brake wire to be radially disposed therethrough, respectively. It has a complicated structure and complicated process, and it is not easy to adjust tension of the brake wire as needed. Besides, the through slots lower the structural strength of the handle. TW497581 discloses the like conventional structure as mentioned above.

The present invention is, therefore, arisen to obviate or at least mitigate the above mentioned disadvantages.

SUMMARY OF THE INVENTION

An object of the present invention is to provide a brake mechanism, in which it has a simple structure and simple process, and it is easy to adjust tension of the brake wire.

To achieve the above and other objects, a brake mechanism is provided, including: a main body, for connecting to a vehicle, having a penetrating hole for a wire to dispose therethrough, the wire having an insertion end which is smaller than the penetrating hole in radial dimension; a handle, restrictably pivoted to the main body via a pivot portion, having an assembling portion; the insertion end being directly axially penetrable through the penetrating hole to be fixedly connected to the assembling portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
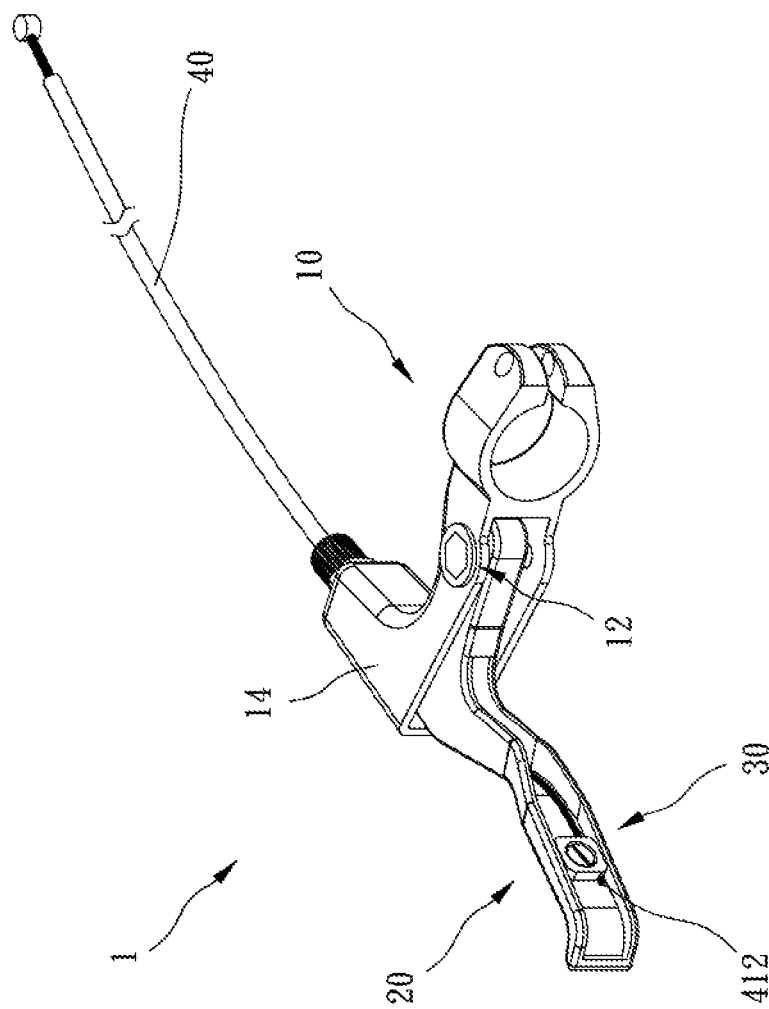
FIG. 1 is a perspective view according to a preferred embodiment of the present invention.
Figure 2:
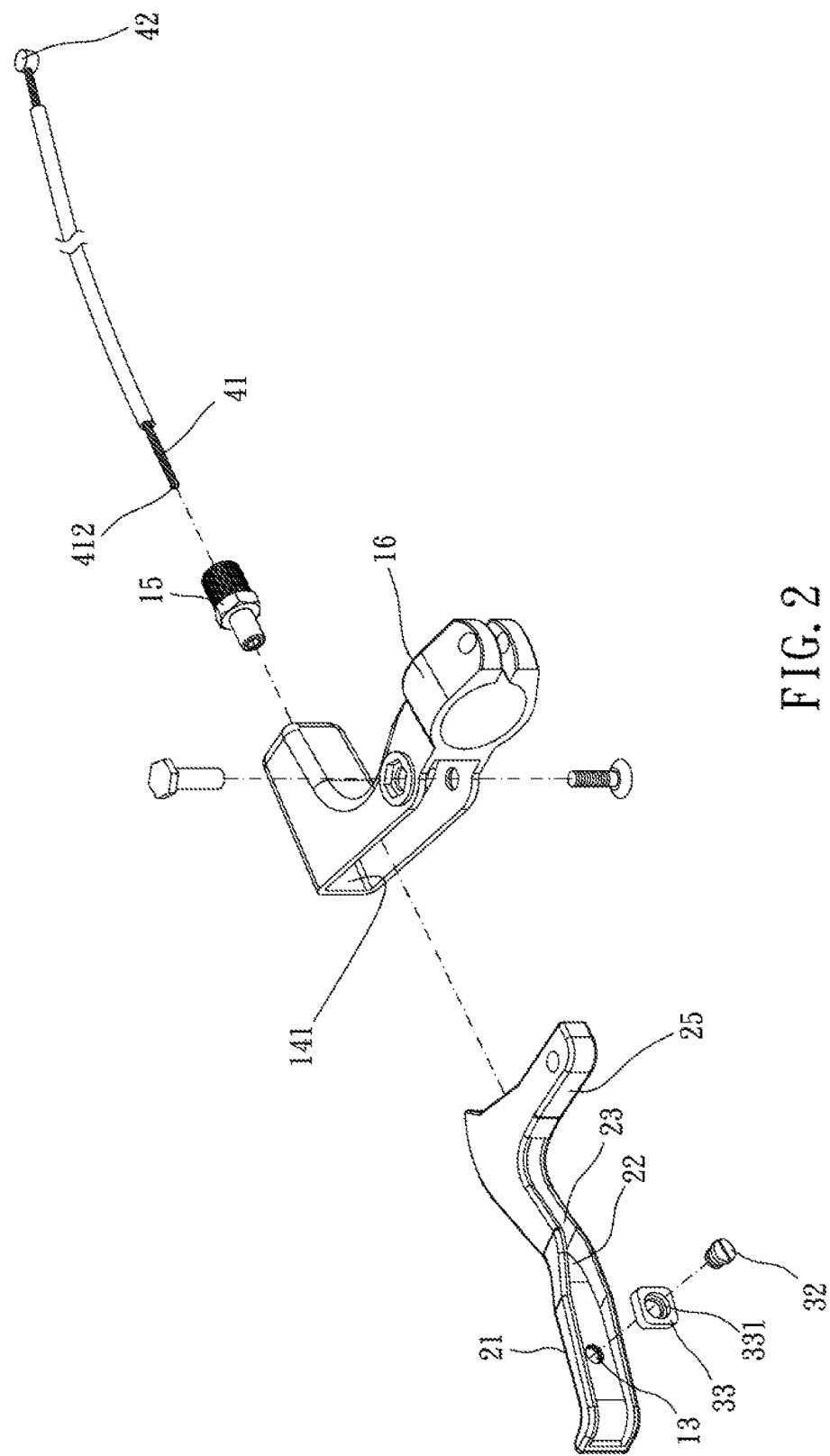
FIG. 2 is a breakdown drawing according to a preferred embodiment of the present invention.
Figure 3:
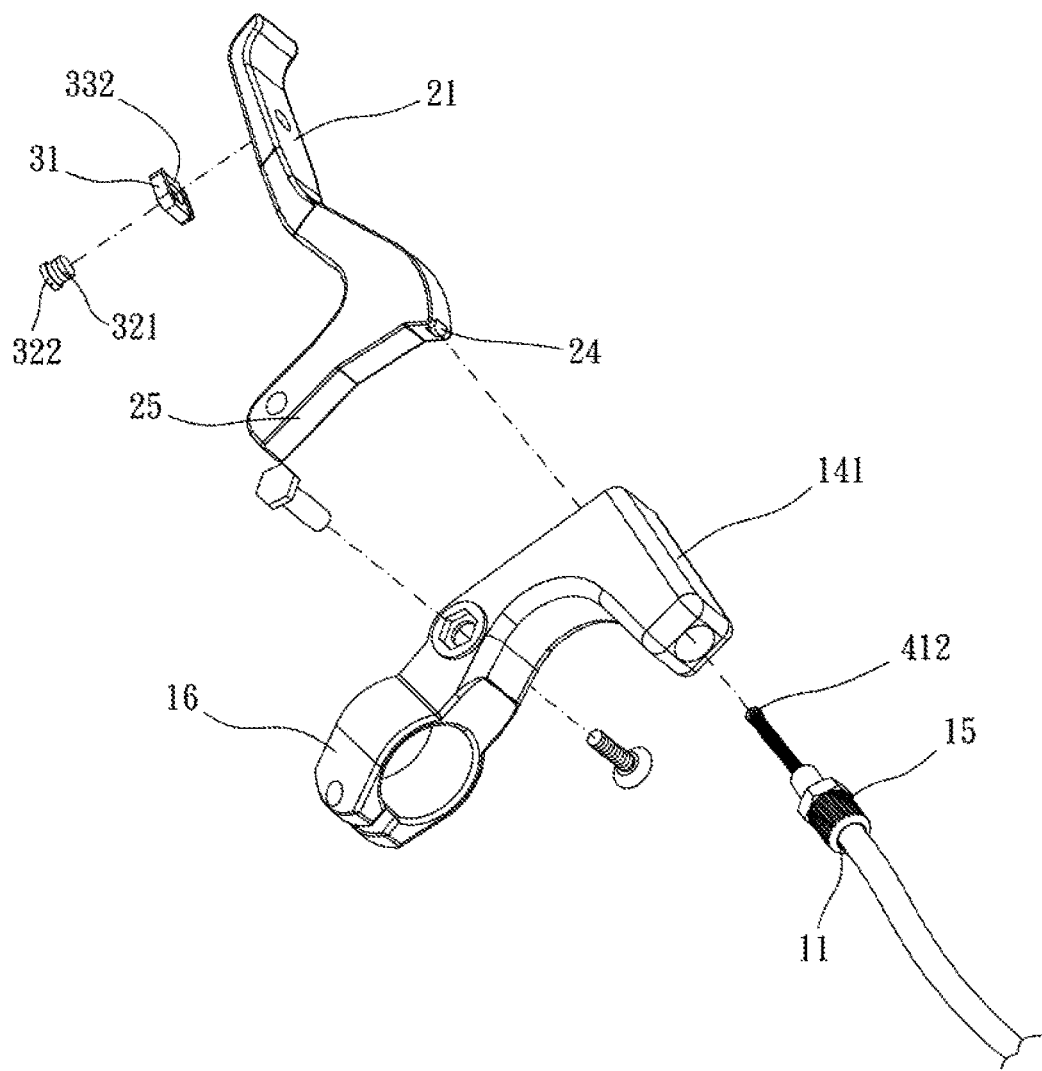
FIG. 3 is a breakdown drawing according to another preferred embodiment of the present invention.
Figures 4, 5:
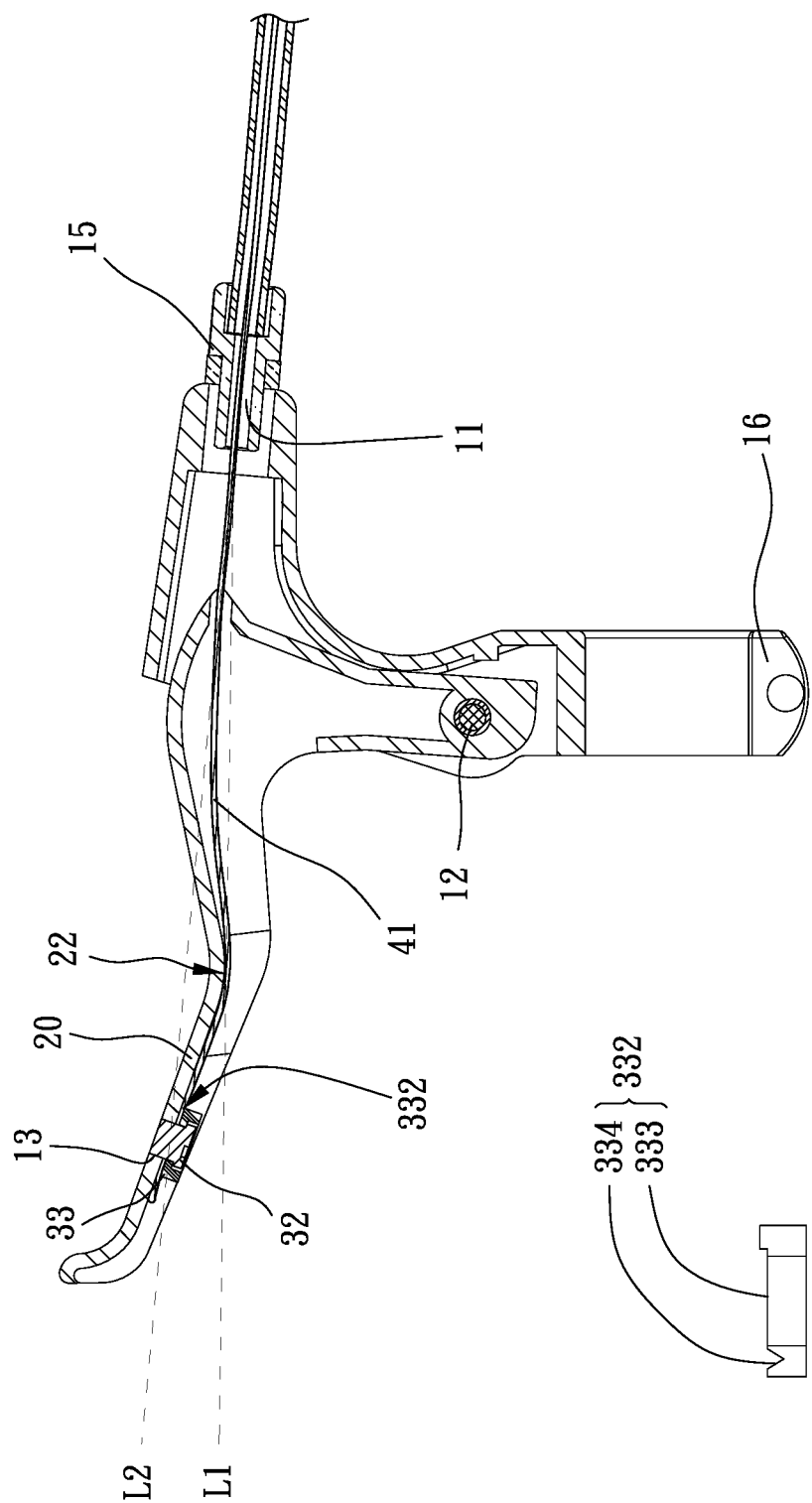
FIG. 4 is a cross-sectional view according to a preferred embodiment of the present invention.
FIG. 5 is a drawing showing a press member according to a preferred embodiment of the present invention.
Figure 6:
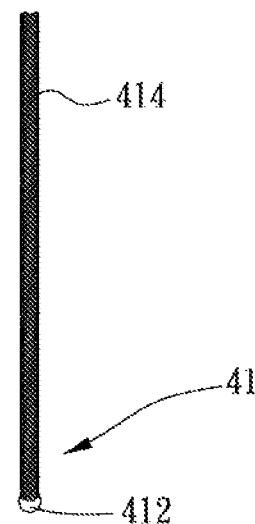
FIG. 6 is a drawing showing a part of a wire according to the preferred embodiment of the present invention.
Figure 7:
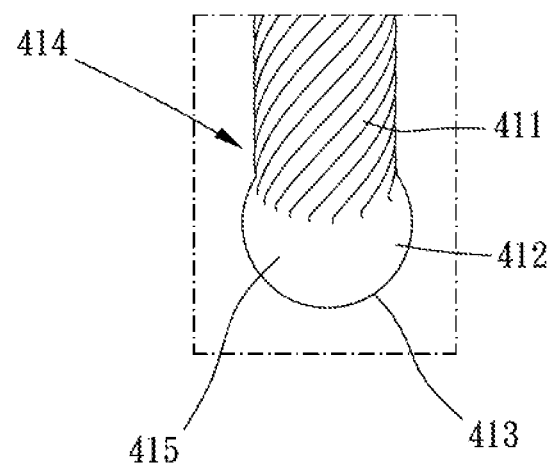
FIG. 7 is an enlarged drawing of FIG. 6.

FIGS. 1-5 show a brake mechanism according to a preferred embodiment of the present invention. The brake mechanism 1 includes a main body 10, a handle 20 and a clamp mechanism 30.

The main body 10 is for connecting to a vehicle and includes a penetrating hole 11 for a wire such as a brake wire 40 to be disposed therethrough. The wire includes an insertion end 41, and the insertion end 41 which is smaller than the penetrating hole 11 in radial dimension. The handle 20 is restrictably pivoted to the main body 10 via a pivot portion 12 and includes an assembling portion 13. The insertion end 41 of the wire is directly axially penetrable the penetrating hole 11 to be fixedly connected to the assembling portion 13. The assembling portion 13 includes the clamp mechanism 30, the clamp mechanism 30 includes a clamp member 31, the clamp member 31 is adjustably close to or away from the assembling portion 13, and adjustment of the clamp member 31 close to the assembling portion 13 operates to clamp the insertion end 41 of the wire between the clamp member 31 and the assembling portion 13. Whereby, the insertion end 41 of the wire can be directly axially disposed through a sheath and directly axially disposed through the main body 10 through the penetrating hole 11, to be fixedly connected to the handle 20. As a result, the brake wire 40 does not need an additional enlarged stub, and upper portions of the main body 10 and the handle 20 does not need through slots for the brake wire 40 to be radially disposed therethrough. It has a simple structure and simple process, and it is easy to adjust tension of the brake wire 40 by fastening or unfastening the clamp mechanism 30.

Specifically, the main body 10 includes a shell member 14 and a sleeve 15 inserted within the shell member 14, and the sleeve 15 includes the penetrating hole 11. Preferably, the sleeve 15 is adjustably inserted (screwed, for example) within the shell member 14, thus allowing adjustment of the tension of the brake wire 40. Because there is no need of radially-through assembling of the brake wire 40 into the main body 10, a side wall 141 of the shell member 14 facing the pivot portion 12 is enclosed and non-slotted, thus providing good structural strength. The main body 10 may include a loop portion 16 for disposing around a handle bar of the vehicle, and the loop portion 16 may be accomplished in various fastening mechanism or means.

The handle 20 includes a grip 21, and the grip 21 protrudes toward the pivot portion 12 and defines a tension corner 22. A phantom line L1 from the penetrating hole 11 to the tension corner 22 is between a phantom line L2 from the penetrating hole 11 to the assembling portion 13 and the pivot portion 12. A cross-section of the grip 21 is substantially U-shaped, the grip 21 includes a mouth 23 at a side by which the pivot portion 12 is disposed, and the clamp mechanism 30 is disposed within the mouth 23 and connected to the grip 21. The brake wire 40 is received within the grip 21 which is substantially U-shaped so that the brake wire 40 cannot disengage from the grip 21, and the brake wire 40 is urged by the tension corner 22 so as to improve clamping effect of the clamp member 31 to the brake wire

40. A portion of the handle 20 is inserted within the shell member 14, one end of the handle 20 opposite to the penetrating hole 11 includes a run-through hole 24 therethrough, and the run-through hole 24 is for insertion of the insertion end 41 of the brake wire 40. Preferably, the portion of the handle 20 inserted within the shell member 14 includes an enclosed wall 25, and thus providing good structural strength, limiting operable range of the handle 20 due to the abutment of the enclosed wall 25 against the shell member 14. The run-through hole 24 is disposed at an upper portion of the enclosed wall 25 facing the penetrating hole 11.

The clamp mechanism 30 includes a screw member 32 screwed to the assembling portion 13 and a press member 33 between the screw member 32 and the handle 20, and the press member 33 includes the clamp member 31. The screw member 32 includes a body portion 321 screwed to the assembling portion 13 and an enlarged head portion 322 connected with the body portion 321. The press member 33 includes a stepped through hole 331 tapered toward the handle 20, and the enlarged head portion 322 is engaged within the stepped through hole 331. The press member 33 further includes a pressing recess 332 facing the handle 20, and the pressing recess 332 is for holding the wire between the clamp member 31 and the handle 20. The pressing recess 332 includes a shallow recess 333 and a deep recess 334, for a wire having a large diameter or small diameter. However, the clamp mechanism 30 can be accomplished by a mechanism which can fasten the insertion end 41.

The brake mechanism 1 may further include a brake wire 40, the brake wire 40 includes an insertion end 41 and a stub 42. The insertion end 41 of the brake wire 40 is disposed through the penetrating hole 11, extends toward the assembling portion 13 (or toward the clamp mechanism 30) and is fixedly attached to the assembling portion (clamped between the clamp member 31 and the handle 20 by the clamp member 31), and the stub 42 is for being engaged to a brake. Through pressing the handle 20 the brake wire 40 is pulled to drive the brake.

Figures 8, 9:
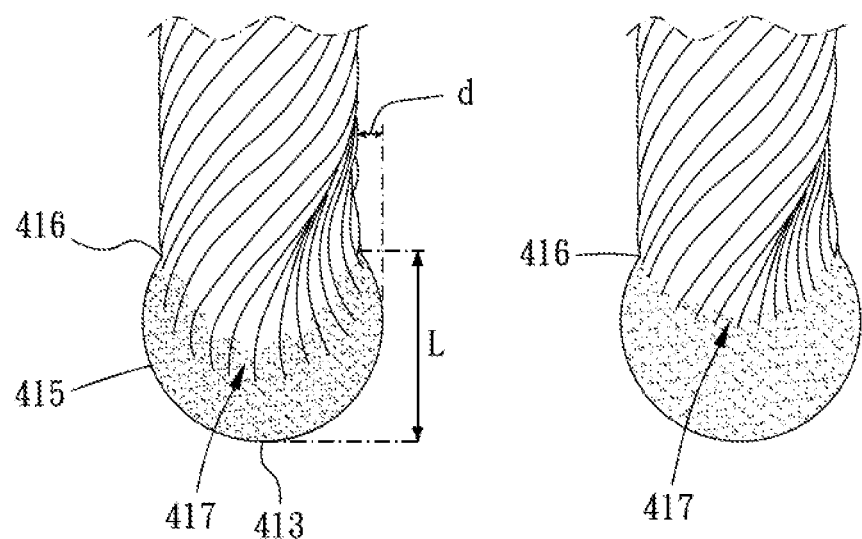
FIGS. 8 to 10 are partial cross-sectional drawings showing wires with different types of melted ends according to the present invention.
Figure 10:
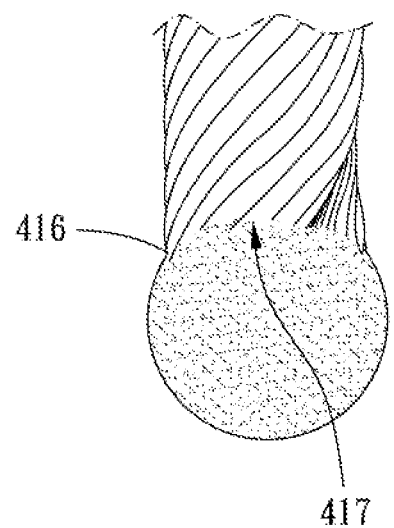

The insertion end 41 is smaller than the penetrating hole 11 in radial dimension. As shown in FIGS. 8 to 10, the insertion end 41 is composed of a plurality of unit filaments 411. The unit filaments 411 are made of metal twisted together, distal ends of the unit filaments 411 are melted in one piece to form a melted end 412, and the melted end 412 includes a distal end face 413 which is a part of a ball surface and is the endmost surface of the wire. The wire further includes a filament gather section 414, the melted end 412 is enlarged relative to the filament gather section 414 and integrally connected with an end of the filament gather section 414, and a diameter of the melted end 412 is smaller than 1.5 times a diameter of the filament gather section 414.

An outer surface of the melted end 412 is a continuously curved smooth face 415. A side of the melted end 412 radially exceeds beyond the filament gather section 414 in a predetermined distance d, and the predetermined distance d is between 0.3 to 1.5 times a diameter of the unit filament 411. In a lengthwise cross-sectional profile of the melted end 412, the filament gather section 414 and the melted end 412 adjoin each other to form an outer adjoining edge 416 and an inner adjoining face 417. A dimension from the inner adjoining face 415 to the distal end face 413 is between 0.5 to 8 times a diameter of the unit filament 411. An extent L of the melted end 412 along a longitudinal direction of the wire is between 1 to 5 times a diameter of the unit filament 411.

Given the above, the brake mechanism the brake wire does not need an additional enlarged stub at one end, and upper portions of the main body and the handle does not need through slots for the brake wire to be radially disposed therethrough. It has a simple structure and simple process, and it is easy to adjust tension of the brake wire by fastening or unfastening the clamp mechanism.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A brake mechanism, including:
   a main body having a penetrating hole;
   a wire having an insertion end which has a diameter smaller than a diameter of the penetrating hole, the wire composed of a plurality of unit filaments, the plurality of unit filaments being made of metal and twisted together, each unit filament having a respective distal end with the respective distal ends being melted to form a single melted end, the melted end including a distal end face which is a part of a ball surface and is the endmost surface of the wire, the wire further including a filament gather section, the melted end being enlarged relative to the filament gather section and integrally connected with an end of the filament gather section, a diameter of the melted end being smaller than 1.5 times a diameter of the filament gather section;
   a handle restrictably pivoted relative to the main body via a pivot portion, the handle integrally formed with an assembling portion which is a through threaded hole;
   wherein the insertion end is directly axially disposed through the penetrating hole to be fixedly connected to the assembling portion;
   wherein the brake mechanism further includes a clamp mechanism, the clamp mechanism includes a clamp member, the clamp member is adjustably close to or away from the assembling portion, and adjustment of the clamp member close to the assembling portion operates to clamp the insertion end of the wire between the clamp member and the assembling portion;
   wherein the clamp mechanism further includes a screw member screwed into the through threaded hole, and the clamp member is located between the screw member and the handle;
   wherein the screw member includes a body portion screwed into the through threaded hole and an enlarged head portion connected with the body portion, the clamp member includes a stepped through hole tapered toward the handle, and the enlarged head portion is engaged within the stepped through hole;
   wherein the clamp member includes a pressing recess facing the handle, and the pressing recess is for holding the wire between the clamp member and the handle;
   wherein the pressing recess includes a shallow recess and a deep recess.

2. The brake mechanism of claim 1, wherein the main body includes a shell member and a sleeve inserted within the shell member, and the sleeve includes the penetrating hole.

3. The brake mechanism of claim 1, wherein the handle protrudes toward the pivot portion and defines a tension corner, a phantom line from the penetrating hole to the tension corner is between the pivot portion and a phantom line from the penetrating hole to the assembling portion.

4. The brake mechanism of claim 1, wherein the main body includes a shell member, a portion of the handle is inserted in the shell member, one end of the handle opposite to the penetrating hole includes a run-through hole therethrough, and the insertion end of the wire is disposed through the run-through hole.

5. The brake mechanism of claim 1, wherein the wire further includes a stub, and the insertion end of the wire extends toward the assembling portion and is fixedly attached to the assembling portion.

6. The brake mechanism of claim 1, wherein the melted end radially exceeds beyond the filament gather section in a predetermined distance, and the predetermined distance is between 0.3 to 1.5 times a respective diameter of each of the plurality of unit filaments.

7. The brake mechanism of claim 1, wherein in a lengthwise cross-sectional profile of the melted end, the filament gather section and the melted end adjoin each other to form an outer adjoining edge and an inner adjoining face.

8. The brake mechanism of claim 7, wherein a dimension from the inner adjoining face to the distal end face is between 0.5 to 8 times a respective diameter of each of the plurality of unit filaments.

9. The brake mechanism of claim 1, wherein an extent of the melted end along a longitudinal direction of the wire is between 1 to 5 times a respective diameter of each of the plurality of unit filaments.

\* \* \* \* \*